United States Patent [19]
Rohn

[11] Patent Number: 5,324,462
[45] Date of Patent: Jun. 28, 1994

[54] PROCESS FOR THE MANUFACTURE OF MOULDED MATERIAL-COVERED PRODUCT

[75] Inventor: Wolfgang K. Rohn, Newmarket, Canada

[73] Assignee: Atoma International, Inc., Newmarket, Canada

[21] Appl. No.: 821,774

[22] Filed: Jan. 16, 1992

Related U.S. Application Data

[60] Division of Ser. No. 671,148, Mar. 18, 1991, Pat. No. 5,098,270, which is a continuation of Ser. No. 194,530, May 12, 1988, abandoned.

[30] Foreign Application Priority Data

May 14, 1987 [CA] Canada .................. 537150

[51] Int. Cl.⁵ .............................. B29C 67/22
[52] U.S. Cl. ................. 264/46.4; 264/46.6; 264/46.8; 264/278; 264/511
[58] Field of Search ........... 264/46.4, 46.6, 46.8, 264/511, 278, 553

[56] References Cited

U.S. PATENT DOCUMENTS

| | | |
|---|---|---|
| 3,576,930 | 4/1971 | Watters . |
| 3,878,277 | 4/1975 | Velte . |
| 3,943,215 | 3/1976 | Grune et al. ............ 264/46.8 |
| 4,176,154 | 11/1979 | Miki et al. ............ 264/553 |
| 4,207,278 | 6/1980 | Cowen . |
| 4,552,522 | 11/1985 | Van Melle . |
| 4,715,916 | 12/1987 | Shimada . |
| 4,740,260 | 4/1988 | Selbert . |
| 4,793,793 | 12/1988 | Swenson et al. ............ 264/46.8 |
| 4,808,100 | 2/1989 | Onnenberg et al. ............ 264/46.8 |
| 4,847,034 | 7/1989 | Araki et al. ............ 264/553 |
| 4,853,995 | 8/1989 | Bethell . |
| 4,860,415 | 8/1989 | Witzke ............ 264/46.8 |
| 4,938,912 | 7/1990 | Pelzer ............ 264/46.8 |
| 5,000,805 | 3/1991 | Lowe . |
| 5,058,955 | 10/1991 | Sugiura et al. ............ 264/46.6 |
| 5,069,837 | 12/1991 | Sember, III et al. ............ 264/278 |
| 5,114,639 | 5/1992 | Kurz et al. ............ 264/46.6 |

FOREIGN PATENT DOCUMENTS

| | | |
|---|---|---|
| 2237668 | 6/1973 | Fed. Rep. of Germany . |
| 3034973 | 3/1982 | Fed. Rep. of Germany ..... 264/46.8 |
| 3633919 | 7/1987 | Fed. Rep. of Germany ..... 264/46.8 |
| 3633920 | 7/1987 | Fed. Rep. of Germany . |
| 3633921 | 9/1987 | Fed. Rep. of Germany . |
| 2280491 | 2/1976 | France . |
| 2293398 | 7/1976 | France . |
| 2578189 | 9/1986 | France . |
| 238768 | 3/1986 | German Democratic Rep. . |
| 51-41765 | 4/1976 | Japan . |
| 53-66978 | 6/1978 | Japan . |
| 58-101029 | 6/1983 | Japan .................. 264/46.8 |
| 60-122118 | 6/1985 | Japan . |
| 61-280908 | 12/1986 | Japan . |
| 61-297120 | 12/1986 | Japan . |
| 63-78716 | 4/1988 | Japan . |

Primary Examiner—Allan R. Kuhns
Attorney, Agent, or Firm—Cushman, Darby & Cushman

[57] ABSTRACT

A process for the manufacture of moulded material-covered products is provided wherein material is placed over a mould and held by clamping means proximate the periphery of the mould and thereafter material is drawn into the mould to conform to the shape of the interior surface of the mould prior to the injection of foamable thermoplastics material into the mould to form the product. The process includes the step of disposing a stop at predetermined positions on the material so that when the material is drawn into the mould, the stop precludes further material from ingressing into the mould and any further movement of material into mould is by the stretching of material. A mould for moulding the moulded product is also provided which includes a bottom and side wall formation surrounding the bottom proximate the periphery of the bottom, the bottom carrying on its surface a design to be carried by the moulded product, the bottom being separate from the side wall formation sot hat the side wall formation can be spaced from the bottom and be lowered to engage the bottom proximate the periphery of the bottom. The bottom may be one piece or may include a base supporting a tongue movable to a raised position for receiving a bag or sack of material for the purposes of injecting foamable thermoplastics material onto the bag or sack.

4 Claims, 8 Drawing Sheets

PROCESS FOR THE MANUFACTURE OF MOULDED MATERIAL-COVERED PRODUCT

This application is a division of application Ser. No. 07/671,148, filed on Mar. 18, 1991, now U.S. Pat. No. 5,098,270, issued on Mar. 24, 1992 which is in turn a continuation of Application No. 07/194,530, filed on May 12, 1988, now abandoned.

FIELD OF INVENTION

This invention relates to a process of manufacturing moulded material-covered products, the improved products, and components and equipment suitable for use to mould such products. This invention is suitable for use in the manufacture of "foam-in-place" products such as head rests, seat backs, seat cushions, particularly for motor vehicles and the like, as well as seating accessories and ottomans and the like.

BACKGROUND OF THE INVENTION

In, for example, the manufacture of seat cushions, impervious material, which is impervious to the passage of foam material and air, is placed over a mould and is held by a slip ring at the periphery of the mould. Excess material extends beyond the slip ring and, when the process is carried out and the vacuum draws the material into the mould, some of the excess material is drawn past the slip ring. As is apparent, the pressure of the slip ring on the material controls the amount of material that passes into the mould. With greater pressure applied by the slip ring to hold the material, more of the material is stretched as the vacuum is applied and stretched material is drawn into the mould to conform to the inner surface of the mould. However, thin spots may result. On the other hand, if the slip ring exerts less pressure, then more material may enter into the mould to conform to the inner surface of the mould. However, wrinkles will then occur in the material.

A further difficult with the procedure is that the process of positioning each piece of material in the mould is operator dependent. With respect to each piece of material, the operator must use his or her judgment to ensure that sufficient material is drawn into the mould with sufficient stretching so that there are no wrinkles in the material in the mould and no thin spots prior to the closing of the mould land injecting for example, polyurethane foam material into the mould which adheres to the material forming the interior of the finished product. The operator must then repeat this same process with each operation to achieve a finished product which will be slightly different from the next.

Furthermore, after for example a seat bottom or cushion for a vehicle has been moulded, excess material must be removed. Thereafter, mounting skirts are sewn or secured ont he edges of the seat cushion. In most instances, the material used is stretchy, as, for example, Lycra, being tightly woven so the material can stretch. However, such material is costly.

It is therefore an object of this invention to provide improved products and improved processes for manufacturing such products.

It is a further object of this invention to reduce the set-up time for the moulding of such products.

It is a further object of the invention to reduce the costs of manufacturing such products.

It is a further object of the invention to produce such products with less costly materials.

It is a further object of the invention to provide improved components and equipment suitable for use in such processes.

It is still a further object of this invention to provide some improved components and equipment which are made up of less parts than the equipment they replace.

Further and other objects of the invention will be realized by those skilled in the art by the following summary of the invention and detailed description of the embodiments thereof.

SUMMARY OF THE INVENTION

According to one aspect of the invention, an improved process for the manufacture of moulded material-covered product is provided wherein material impervious to the passage of foam therethrough, for example, lined fabric or lined vinyl, is placed over a mould and held by clamping means, as, for example, a slip ring, proximate the periphery of the mould and thereafter preferably a central portion is positioned in the mould, as, for example, by a vacuum applied to the mould to draw the material into the interior surface of the mould, to conform the impervious material to the shape of the mould prior to the injection of foam into the impervious material in the mould to form the product, as, for example, head rests, seat backs, seat cushions, seat accessories particularly for motor vehicles, and ottomans, and the like, the improvement in the process comprising the step of disposing a stop at predetermined positions on the material so that when material is positioned in the mould, as, for example, when the material is drawn into the mould by vacuum, the stop precludes further material from ingressing into the mould and any further movement of material into the mould is by the stretching of material with preferably minimal stretching. The material may also be permeable to the passage of foam therethrough and the foam injected into the mould in that event will be a fast curing foam which penetrates into the material, but not through the material, by the time it is cured. When the foam expands, it pushes the material into the face of the mould and causes the material to conform thereto. A mechanical device may be used to force the material into the mould to conform to the design of the mould.

The stop may be either continuous or discontinuous and may be permanently secured to the material and may comprise:

(a) a seam such as a deck seam, a french seam or any seam which provides a structure which, when engaging the slip ring, will not be able to pass between the slip ring and the periphery of the mould;

(b) welting carried in the material which, when the product is moulded, may comprise a styling line;

(c) an extra thickness in the material, then where the space between the slip ring and the periphery of the mould permits the passage of a single thickness of material therebetween, the stop may comprise a double or triple thickness of material;

(d) J-strips of predetermined length sewn at intervals from one another at predetermined positions for engaging the slip ring periphery as the material is drawn into the mould; the J-strips may then be used for other purposes such as fastening when the product is moulded;

(e) wire sewn into the material.

Thus, when the clamping means, as, for example, the slip ring, is engaged by the stop, further movement of material into the mould is by stretching in order to conform to the shape of the interior of the mould. Thus, if stops are provided in identical places on identical pieces of material from the same roll, then there is no judgment required by the operator. The stop may be continuous, enclosing a predetermined area of material or be discontinuous or interrupted.

The stop may also be removable secured to the material after the product is manufactured. The clips may be spaced at intervals from one another.

Thus, with respect to the placing of the impervious material over the mould and between the slip ring and periphery of the mould, the stop may be positioned a given distance as desired from the slip ring and then as the material is drawn into the mould, the stop engages the slip ring and because the stop is larger than the space between the slip ring and mould periphery, the stop precludes any further passage of material into the mould, permitting only stretching of the material as it is drawn into the mould. Thus, it is apparent that once the desired stop position is determined for one piece of material fabric, like fabric from the same batch will be expected to behave in the same way and stops located in the same place will permit substantially identical products to be manufactured time and time again. Thus, by determining the appropriate stop with respect to one sheet of impervious material fabric, as, for example, vinyl, etc., to provide just the right amount of stretching to preclude wrinkling with the appropriate ingress of material into the mould, remaining pieces can be provided the same stops to achieve the same result.

According to another aspect of the invention, air or other gas may be introduced in the space between the material in the mould and the interior surface of the mould thereby causing the material to be blown up becoming a bubble of material elevated from the mould design drawing the material past the clamping ring, e.g., slip ring, into the mould until the stop precludes further material from ingressing into the mould and any further movement of material into the mould is by the stretching of material. Thereafter, the passage of the gas into the space between the mould and material is stopped, and the material is drawn into the interior surface of the mould carrying the design. This may be accomplished by applying a vacuum to the space between the material and surface of mould or by a mechanical device.

In one embodiment, the cured foam is formed with a groove in the material to receive any permanently secured stops, as, for example, a seam, secured to the material to give a better look to the finished product.

According to another aspect of the invention, a process is provided suitable for use to manufacture moulded material products wherein material is placed over a mould and held proximate the periphery of the mould and which is thereafter positioned in the mould to conform to the shape of at least the bottom of the mould prior to the injection of foam into the mould to form the product, the improvement in the process comprising the step of feeding gas into the mould between the interior bottom surface of the mould land the material causing material outside the mould to be drawn into the mould, and thereafter causing the material to be drawn into intimate contact with at least the bottom interior surface of the mould.

According to another aspect of the invention, an improved mould for moulding a moulded product is provided, the mould comprising a bottom and side wall formation (e.g., comprising a continuous side wall formation or a plurality of discontinuous walls which together may be brought together to form the side wall formation) surrounding the bottom proximate the periphery of the bottom, the bottom carrying on its surface a design to be carried by the moulded product, the bottom being separate from the side wall formation so that the side wall formation can be spaced, e.g., elevated, from the bottom and be lowered to engage the bottom proximate the periphery of the bottom. The bottom in one embodiment is preferably undercut for better engagement with the side wall formation. With this construction, the slip ring is dispensed with and the separate side wall formation may double for the slip ring as well as act as the side wall formation of the mould. The bottom may comprise apertures therethrough in communication with a source of vacuum or source of gas.

Thus, the side wall formation may be raised or lowered to a predetermined height above the mould bottom. The space between the lower edge of the side wall formation and bottom is thus made not large enough to permit passage of the stop therethrough. The material, after being placed in the mould (e.g., between the side wall formation and bottom) may be blown up or a vacuum applied to the bottom of the material drawing the material into the mould until the stop engages the edge of the side wall and is precluded from passing through the space between the side wall formation and bottom into the mould. Thereafter, any further entry of material into the mould is by stretching. The mould side wall formation can then be further lowered to clamp the material between the bottom and side wall formation to close the mould and reduce the space between the bottom and lower edge of side wall.

The material can also be mechanically placed in the mould bottom.

Additionally, because the bottom is not secured to the mould side wall formation, moulded product can be formed with foamed material secured to material engaging the mould bottom but not secured to material which will form the side walls of the product. In this regard, a product, for example, a seat bottom having a bottom and depending side walls or skirts, can be manufactured with the bottom secured to foamed thermoplastics material (e.g., styrofoam) but the material comprising the side walls of the seat secured to the material comprising the bottom is not secured to the foam material without applying coatings to the inside surface of the side wall material which will be the side skirts proximate the foam to preclude the foam becoming secured to the inside surface of the side wall or skirt material. To produce such product (e.g., a seat), the material comprising the seat bottom is secured at its periphery to the depending seat side wall material, and the secured material is reversed or turned inside-out. Thereafter, the side wall formation of the mould is elevated from the bottom of the mould, the reversed bottom applied to the mould bottom in the turned inside-out condition with the exterior surface of the bottom material engaging the bottom of the mould carrying the design, and the reversed side wall material extending from the periphery of the bottom of the mould away from the side wall formation of the mould. Thereafter, the continuous side wall formation is lowered towards the bottom with the stop, preferably, in this instance, being a seam securing the bottom material to the side wall or skirt material outside the side wall. The bottom material may then be blown up, a vacuum may be applied, or the material may be mechanically placed to engage the bottom. After the material is suitably applied to the mould bottom, the side wall formation can be further lowered onto the bottom, the mould closed by a top, and foamable thermoplastics material injected into the mould which thermoplastics material cures and is secured to the bottom material. Thereafter, the moulded product is removed, the side wall material reversed to their appropriate configuration with the side wall material proximate the sides of the foam material. In this way, the side wall material is not attached to the side of the seat bottom.

In conventional seats with the side walls attached to the foam material, continuous sitting on and getting up from the seat bottom causes the foam and thus the side wall material to buckle and try to restore which action over a prolonged period will tend to cause crease lines to develop in the side walls of the seat.

According to another aspect of the invention, an improved mould for moulding products using a bag or sack of material as, for example, a seat back is provided, the mould comprising:

(a) a bottom carrying the design, the bottom being separable into at least two components:
  (i) a base, and
  (ii) a movable or preferably pivotable tongue which carries the design secured to sit on the base and move, as, for example, pivot at one end thereof from a position seated on the base to a position raised from the base, as, for example, pivot one end to a position raised from the base, and
(b) side wall formation movable away from and towards the bottom preferably comprising a continuous side wall formation or a plurality of discontinuous walls which together may be brought together to form the side wall formation, The bottom may be undercut at its periphery for the purpose of better cooperation and engaging with the lower end of the side wall formation. The tongue may also carry apertures for being secured to a source of vacuum. With this construction, seat backs and such like structures may be manufactured. The seat back may be made from a bag or sack open at one end. The sack or bag comprises a piece of material making up the "A" surface of the seat back, the back of which is the "B" surface. The material comprising the "A" and "B" surfaces is secured at its side edges to material for enclosing the bag or sack to form the sides and back of the seat back. Stops (e.g., seams) may also be provided on the bag or sack. Thereafter, the sack or bag is turned inside-out and mounted on the tongue, with the tongue moved to a raised position, with the "A" surface on the surface of the tongue of the mould carrying the design. Thereafter, the tongue is lowered onto the base, the side wall formation lowered onto the "B" surface with the position of securing the sides carrying the stop to the material carrying the "A" and "B" surfaces to the side edges being outside the side wall formation, the material carrying the "A" and "B" surfaces is drawn into the mould until the stop engages the side wall formation by being blown up then positioned by vacuum or mechanical means or just positioned by mechanical means or vacuum, the side wall formation fully lowered towards the bottom, the mould closed and then foam thermoplastic material introduced into the mould for curing and securing to the "B" surface. Thereafter, the mould is opened, the tongue elevated, the sack or bag removed and the bag turned to present the "A" surface on the outside. The reader will appreciate that no cured foamed thermoplastic material becomes secure to any other surface.

Where mechanical means, as, for example, a plug, are used to mechanically position the material against the design surface on the bottom of the mould, the plug may be segmented with each segment operable individually independent of the others in the mould on the materials. The segmented sections of the plug are employed preferably sequentially. Normally, the center segmented sections are applied first. The sections are thus applied from the center radially outwardly to the edges. When the bubble is employed, e.g., the material is blown up, the material is mechanically worked from outside periphery to the center of the mould.

BRIEF DESCRIPTION OF THE DRAWINGS

The invention will now be illustrated with reference to the accompanying drawings in which.

DETAILED DESCRIPTION OF THE DRAWINGS

Figure 1:
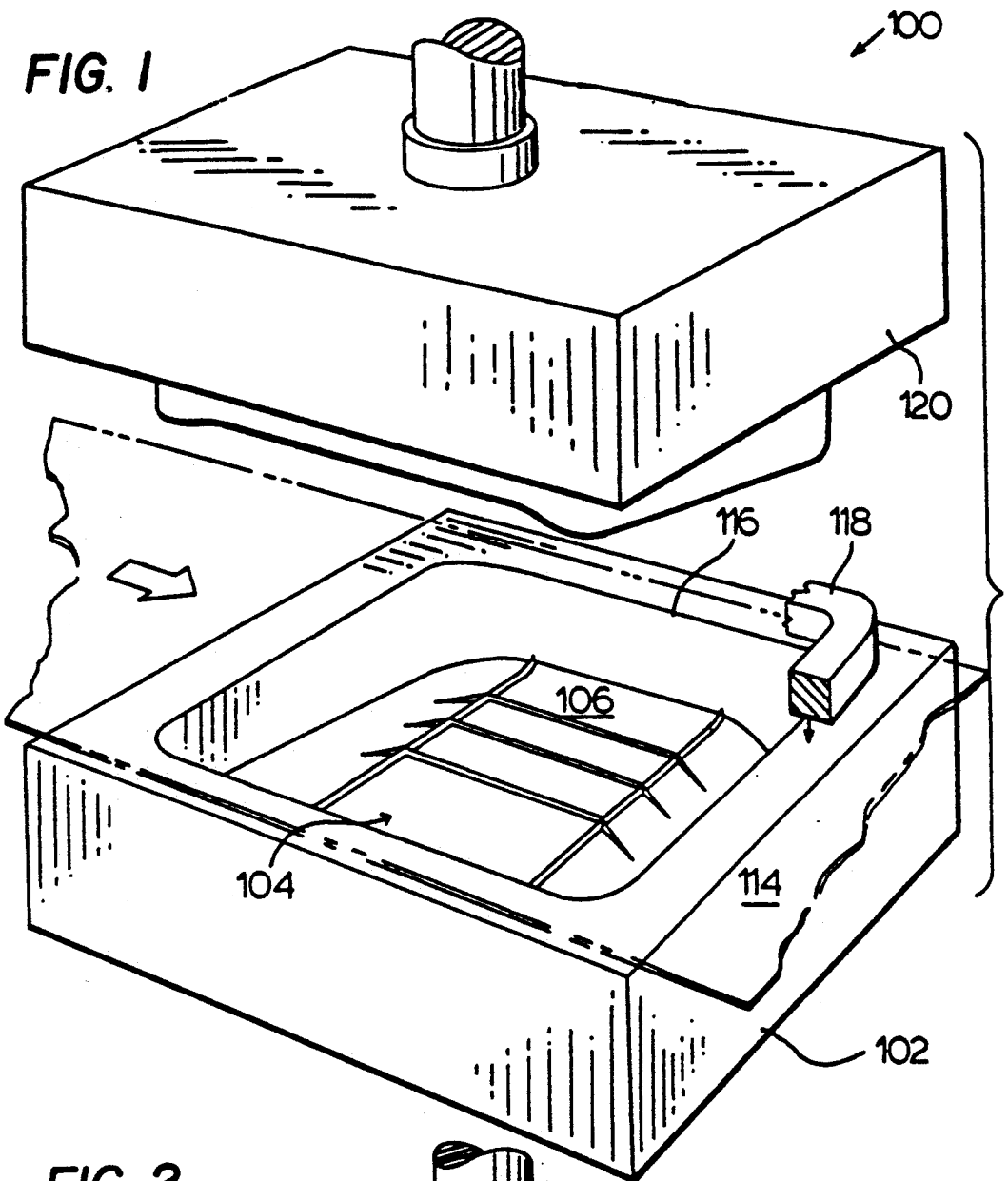
FIG. 1 is a perspective view of a typical mould used to manufacture cushion bottoms or seat bottoms (part of the prior art)
Figure 2:
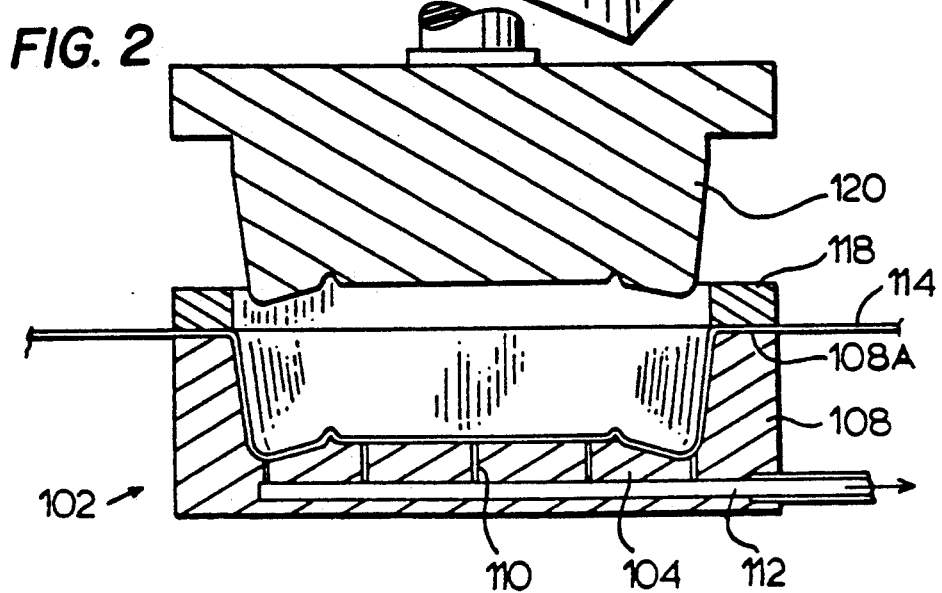
FIG. 2 is a cross-sectional view taken through the mould configuration shown in FIG. 1 in use.

With reference to FIG. 1, there is shown a mould carrying a mould cavity known in the prior art, the mould being identified generally as 100 comprising base 102 carrying moulding cavity, generally identified as 104, carrying mould bottom 106 carrying the design to be carried by the upper surface of the seat bottom and integral upstanding side wall formation 108 integrally formed with bottom 106 making up base 102. Apertures 110 extend through bottom surface 106 and are connected to conduit 112 leading to a vacuum pump for drawing air in the direction shown in FIG. 2, from conduit 112. Sheet of material 114 is brought downwardly to sit on material 114 and clamp the same as is shown in FIG. 2. Integral mechanical device 120 is provided for assisting to depress the sheet of material 114 and clamp same. This may also be accomplished with a source of vacuum. However, as is apparent when the material 114 is drawn into the mould by the source of vacuum or the mechanical device 120 or both, material 114 will be drawn between the upper surface 108A of side wall 108 and slip ring 118 if the clamping action of the slip 118 is not sufficient to hold the material, thus permitting excess material to enter the mould. On the other hand, if the slip 118 is clamped tightly onto the material so that the material 114 is unable to move between the slip ring 118 and the upper surface 108A of side wall 108 into mould cavity 104, then the material stretches as it is being drawn into the cavity to conform to the design on bottom 106 by the mechanical device 120, and/or by the vacuum drawing the material to bottom 106 to conform to the design, the material stretches and thin spots can be the result.

Figure 3:
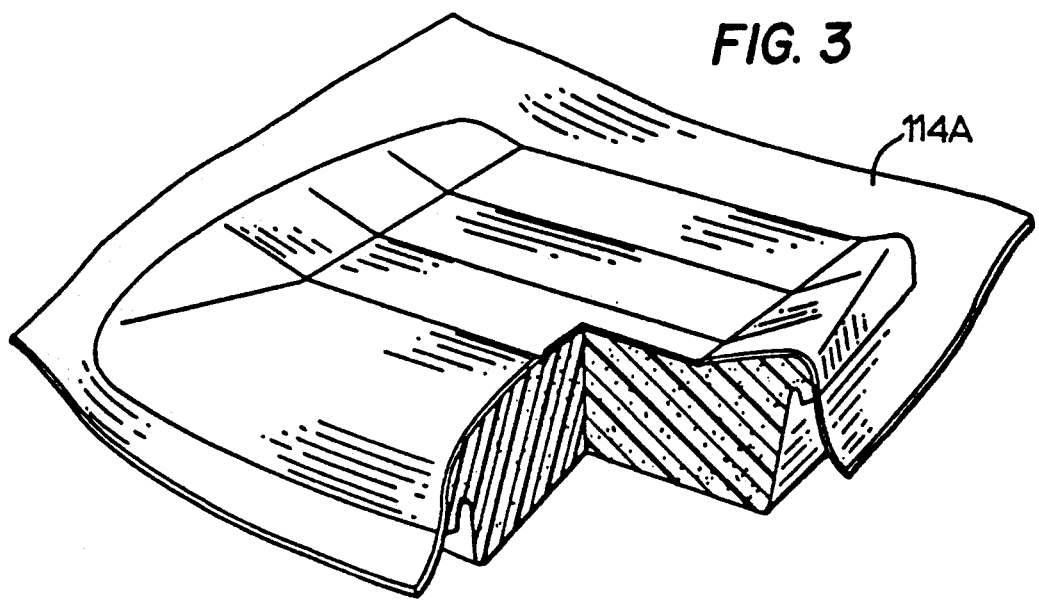
FIG. 3 is a seat bottom manufactured using the mould in the prior art.
Figure 4:
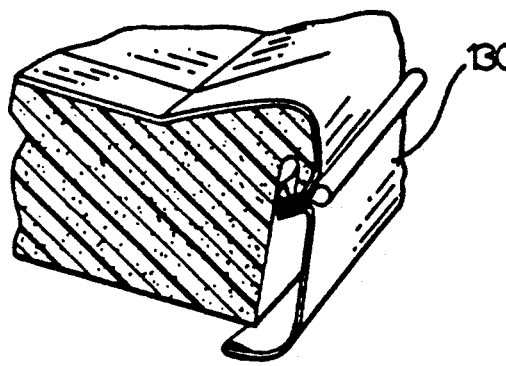
FIG. 4 illustrates the seat bottom or cushion in FIG. 3 having been trimmed and to which has been applied side skirts.

With reference to FIGS. 3 and 4 and having regard to the construction of the mould of the prior art shown in FIGS. 1 and 2, it is apparent that, when sheet material 114 is positioned within the mould in cavity 104, foamable thermoplastics material may be injected into the moulding cavity 104 (not shown) and will be caused to adhere to the material 114 extending across the bottom surface 106 and up the side walls 108 unless any such surface was coated with a material which did not permit the foamed thermoplastic material to adhere to the side wall. When the product is removed from the mould, excess material comprising peripheral flange 114A must be removed and side skirts 130 must be secured to the cushion to finish the product. In the cushion shown in FIGS. 3 and 4, the side wall or skirts of the seat cushion are not attached to the foamed thermoplastic material. Thus, they do not suffer from the same buckling forces on the foam which over a prolonged period will tend to cause crease lines to develop in the side walls of the seat cushion. However, additional costs arise from the additional labor required for trimming the excess material off the seat cushion and sewing the side walls or skirts onto the seat cushion.

With reference to FIG. 2, mechanical device 120 for positioning the sheet of material 114 with the mould is an integral one-piece device.

Figure 5:
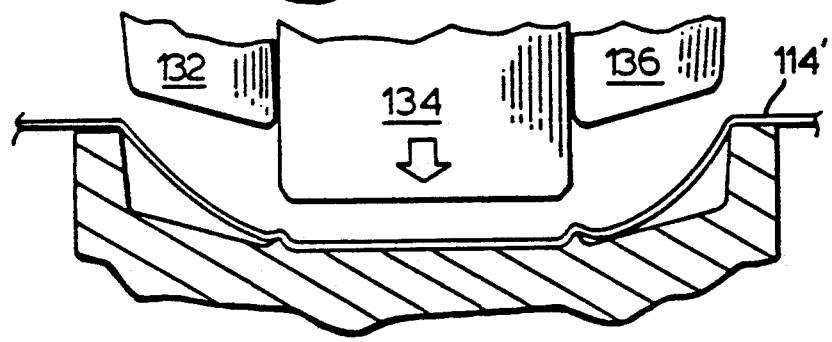
FIG. 5 illustrates a segmented mechanical device for positioning material on the bottom of the mould illustrating the operation of one segment of the mechanical device according to an embodiment of the invention.
Figure 6:
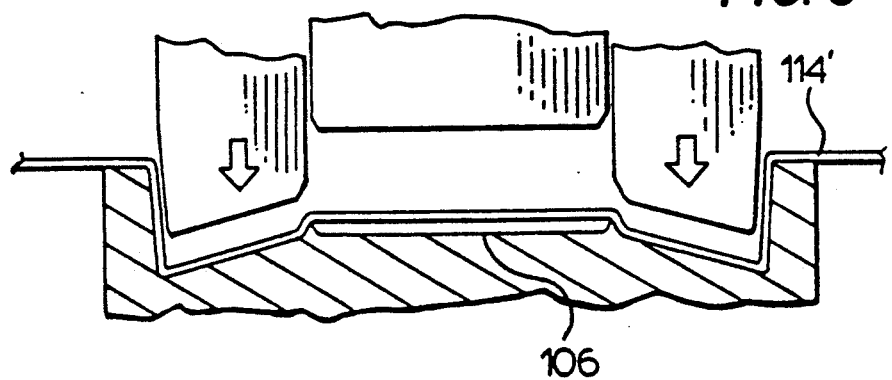
FIG. 6 illustrates the operation of other segments of the mechanical device used to position the material in FIG. 5.

According to one embodiment of the invention, applicant provides, in FIGS. 5 and 6, a mechanical device or plug 120' which is segmented to provide portions 132, 134, and 136. Each of the segmental portions or segments 132, 134, and 136 is operable independently from the others. Thus, a sequence can be set up as shown in FIG. 5, first applying the central segment 134 to the material when the mould bottom is concave in shape and thereafter applying the peripheral segments 132 and 136 to the material to cause the sheet 114' to conform to the design on the bottom 106 of the mould. In FIG. 5, the center of the material 114' has been acted upon by segment 134. In FIG. 6, segments 132 and 136 have acted upon material 114' first because the mould bottom is convex. Thereafter, central segment 134 may then be applied.

Normally, the sections or segments of device 120' are applied from the center radially outward towards the edges, i.e. segmented section 134 and subsequently peripheral edge sections 132 and 136.

Figure 7:
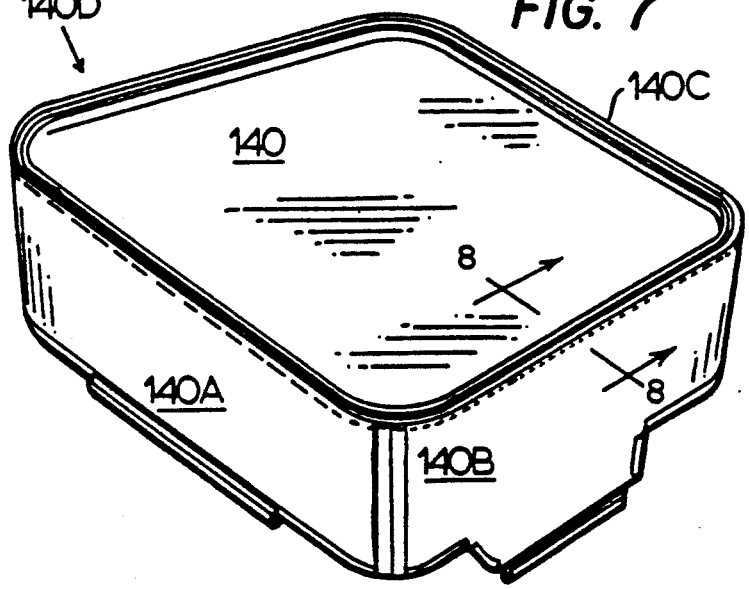
FIG. 7 illustrates the shell covering of a seat cushion turned inside-out according to an embodiment of the invention.
Figure 8:
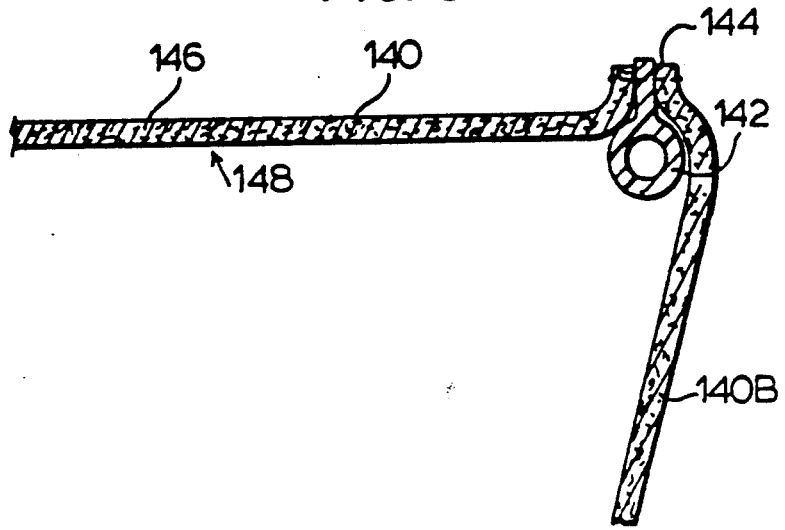
FIG. 8 is a section along the line 8—8 of FIG. 7 illustrating the fastening of two sheets of material together to form the shell covering of FIG. 7.

With reference to FIGS. 9–14 inclusive, a new mould construction is shown to illustrate the manufacture of a seat bottom or seat cushion using the material shell shown in FIG. 7 which has been turned inside-out shown in part in FIG. 8.

With reference to FIG. 7, there is shown shell comprising sheet of material 140 which is to comprise the bottom surface of the cushion on which a person is to be seated sewn at 144 to four separate side skirt or side wall portions 140A, 140B, 140C, and 140D, employing a welting shown as 142 in FIG. 8. Surface 146 of material 140 will be the surface to which the foamable thermoplastics material will be applied or bonded during the process of manufacture whereas surface 148 will be the outer surface of the finished product when the product is completed. Thus, it is clear that the shell made up of all the material components 140 and 140A–140D inclusive sewn together carrying welting 142, which will also act as the stop, is used in its reversed or turned inside-out condition, as shown in FIG. 7, and the shell of material will be inserted onto the mould bottom 106', shown in FIGS. 9–14 inclusive in the inside-out condition.

Figure 9:
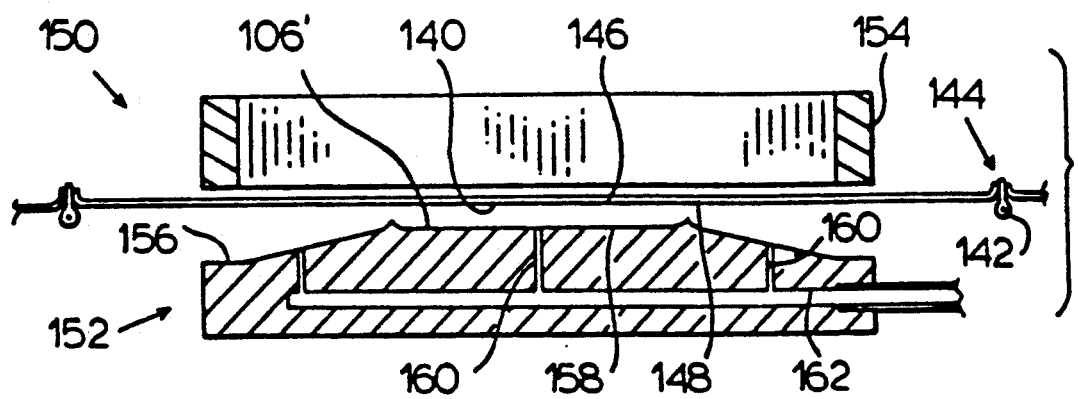

With reference to FIG. 9, an improved mould 150 is provided according to an embodiment of the invention for moulding the finished seat product and like products, the mould comprising a bottom 152 and continuous side wall formation 154 separated from bottom 152 and not integrally attached as in FIGS. 1 and 2. Thus, if side wall formation 154 is brought onto ledge 156 at the periphery of bottom 152, it will form a two-piece moulding cavity to which foamed thermoplastic material can be injected. The benefits of this mould construction will be seen when describing a process of manufacture used to produce the finished seat bottom. In this regard, bottom 152 carries a centrally disposed upper bottom surface 106' carrying the design which the seat cushion is to carry and carrying apertures 160 therethrough leading to conduit 162 which may be connected to a source of gas or a source of vacuum.

With reference to FIG. 9, it is clear that side wall formation 154 doubles not only as a side wall for the mould but also the slip ring which has now been dispensed with.

Figure 14:
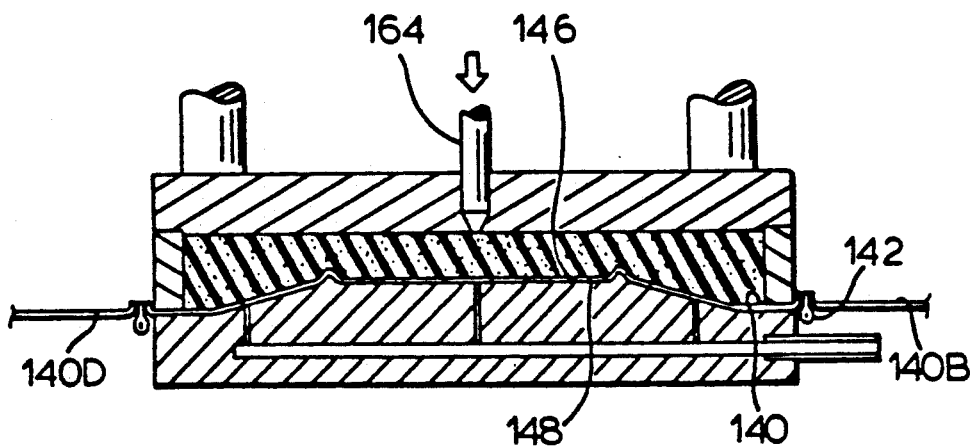
FIGS. 9-14, inclusive, illustrate:
(a) a new mould constructed according to an embodiment of the invention used to manufacture seat cushions, and
(b) a process of manufacturing an improved seat cushion or seat bottom according to another embodiment of the invention.
Figure 10:
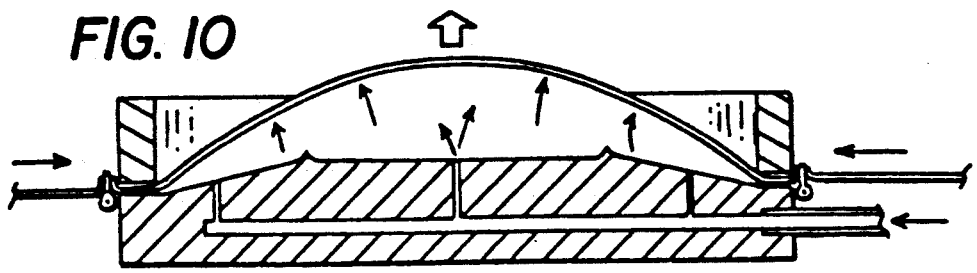
Figure 11:
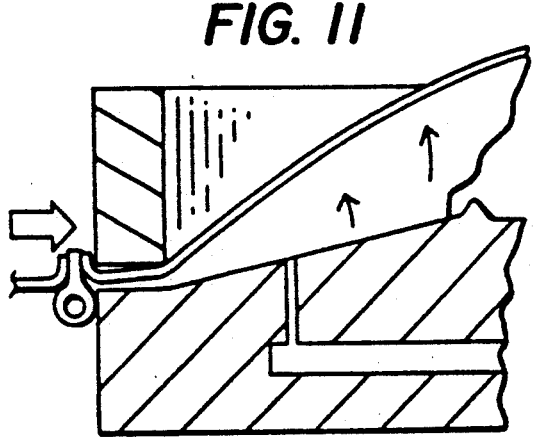
Figure 12:
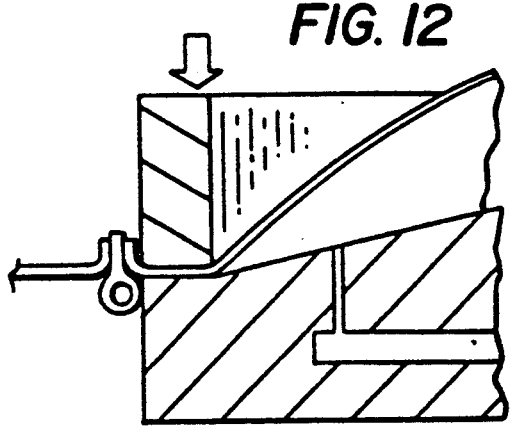
Figure 13:
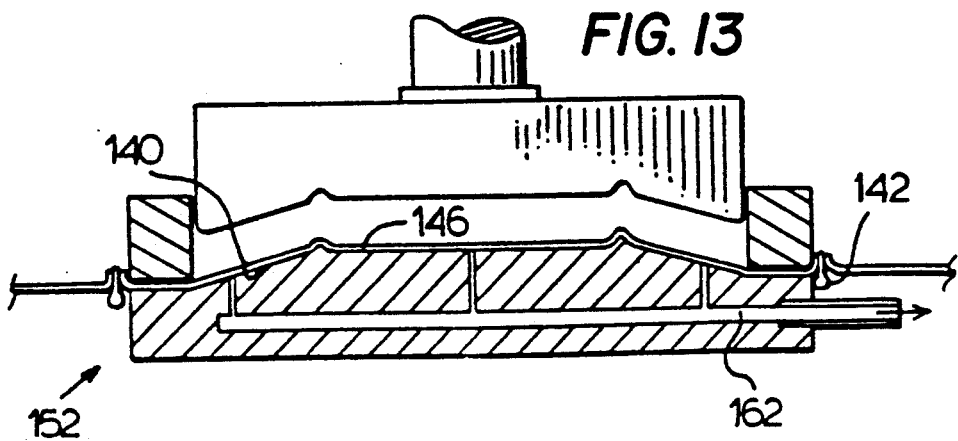
Figure 14A:
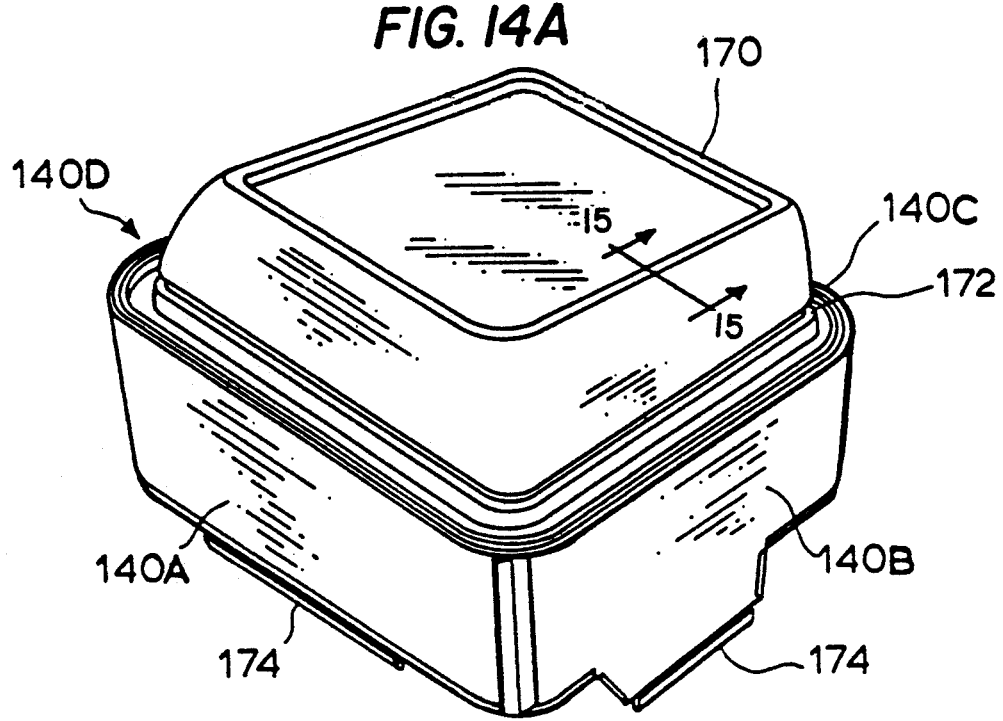
FIG. 14A illustrates the moulded product removed from the mould in FIG. 14 prior to manipulating the side edges or skirts of the material to provide the completed product.
Figure 15:
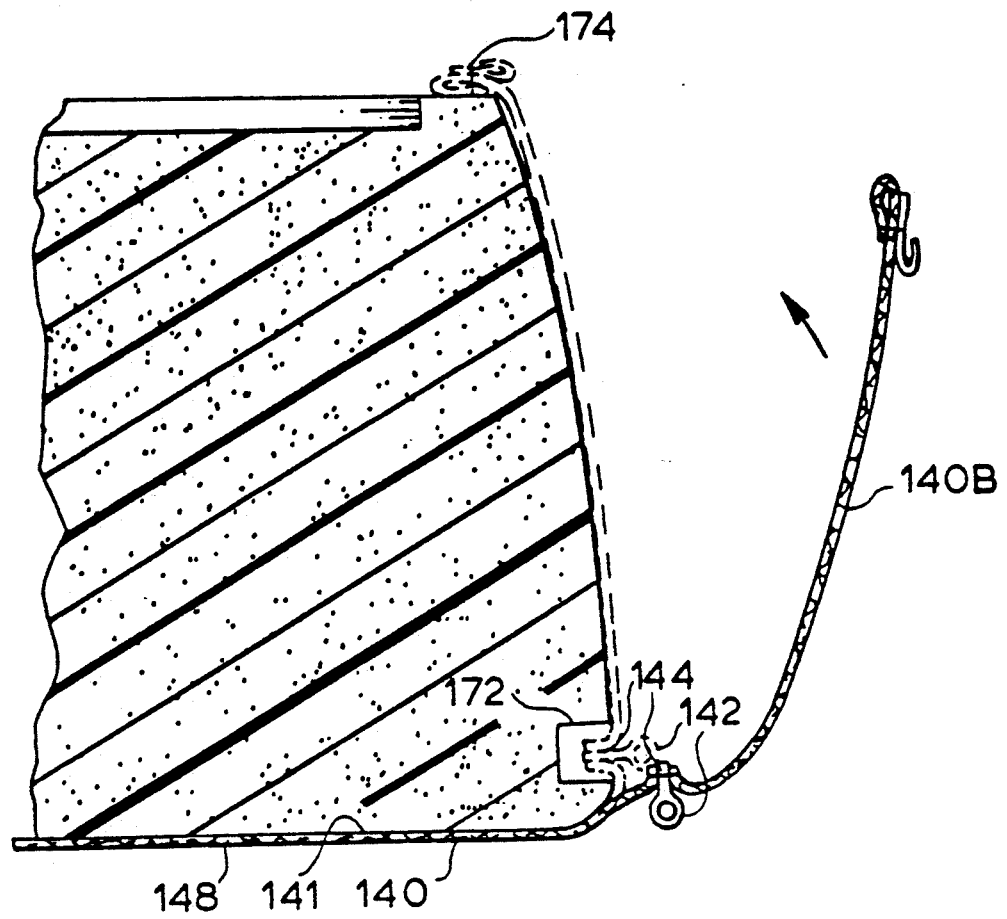
FIG. 15 is a section along the line 15—15 of FIG. 14 with one of the side edges or skirts being moved into the position they will occupy in the finished product.

With reference to FIG. 9 and FIGS. 7 and 8, it is clear that the sheet of material 140 to comprise the bottom is applied to the bottom so that the inside surface 146 is directed upwardly and will be the surface to which the foamed thermoplastic material is cured and outer surface 148 will engage bottom surface 106' to which the design to be carried by the finished seat product is disposed. Thus, it is clear that the structure shown in FIG. 7 with the welting 142 acting as a stop is inserted inside-out. When side wall formation 154 is brought down towards ledge 156 of bottom 152, it exerts a downward pressure on the material as shown in FIG. 10. Thereafter, as air, for example, is fed through conduit 162 through apertures 160 into the space between a sheet of material 140 which will form the seat bottom on which a person will sit when the product is completed and the bottom 106' causing the material to be blown up, as shown in FIG. 10, drawing the material into the cavity formed by the bottom of surface 106' and inside side walls of side wall formation 154 causing welting 142 to engage the side wall formation 154 and bottom 152 and be unable to pass between the space between surface 156 of bottom 152 and the lower edge of side wall formation 154, as shown in FIGS. 10 and 11. Where the same size structure shown in FIG. 7 is duplicated continuously, it is clear that the stops 142 will act to not permit more than the same amount of material to enter into the moulding cavity in each operation. Thereafter, side wall formation 154 is lowered further so as to clamp material 140 in position, as shown in FIG. 12, and the vacuum pump is then activated to withdraw the air between surface 106' and material 140 to cause material 140 to conform to the design on bottom surface 106', as shown in FIG. 13. A mechanical device, such as that shown in FIGS. 5 and 6 may be also used to position the fabric as shown in FIG. 13. Thereafter, foamable thermoplastic material may be injected into the mould via conduit 164 which adheres to fabric material 140 shown in FIG. 14 which is not permeable to the passage of foam therethrough. In some cases, the material may be permeable to such foam material in which event the foamable thermoplastics material is of the type which cures very rapidly and quickly so that it cures before penetrating through the material 140. In any event, after curing of the foamed material, the product is removed in the configuration shown in FIG. 14. The foamed material 170 carries a groove about the periphery thereof for receipt of the welting and seam 142, 144, as shown in FIG. 15. With reference to FIG. 14, it is clear that the side wall or skirts are spaced from the foamed cured thermoplastics material 170 and with the surface 148 on the side of material 140 opposite foamed material 170. Thus, to complete the manufacturing process, the side edges or skirts 140A–140D inclusive are pulled down over the foam portion 170 (in this regard see FIG. 15), the edges of which are secured on the underside of the foam 170 by clips 174 in use. It is also clear from FIG. 15 that groove 172 when skirt 140B is pulled down over foam block 170 receives welting 142 and seam 144. It is clear that the process of manufacture as taught by applicant permits the manufacture of a seat bottom without the inside surfaces of the side skirts or side edges having to receive an application of a coating to preclude the curing of foamed thermoplastic material thereto. Thus, it is clear that, by this simple procedure using the proposed mould construction as proposed by applicant, a simple process of manufacture is provided.

Figure 16:
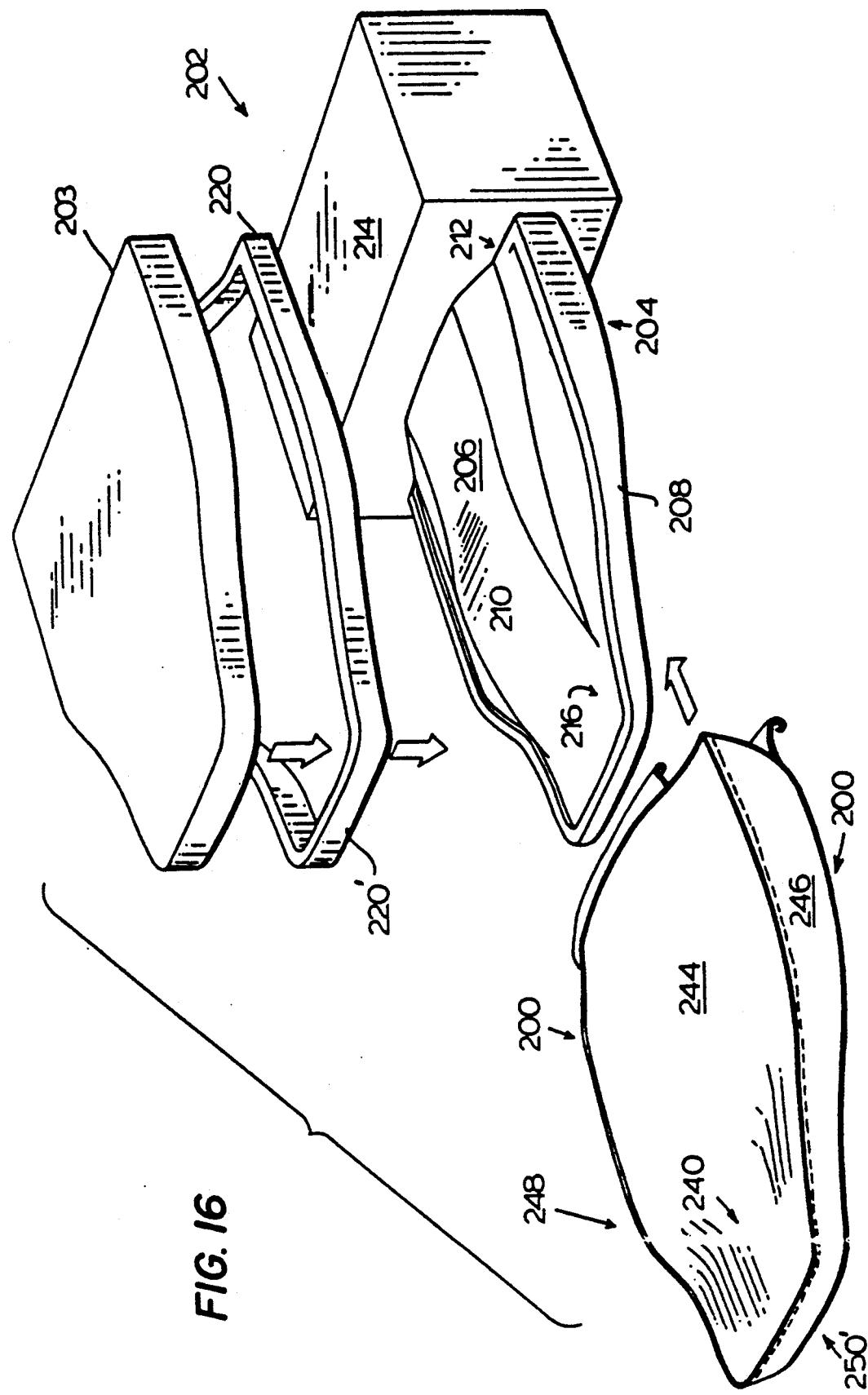
FIG. 16 is an exploded perspective of another moulding apparatus according to another embodiment of the invention illustrating the use thereof to form a seat back of a car vehicle.
Figure 17:
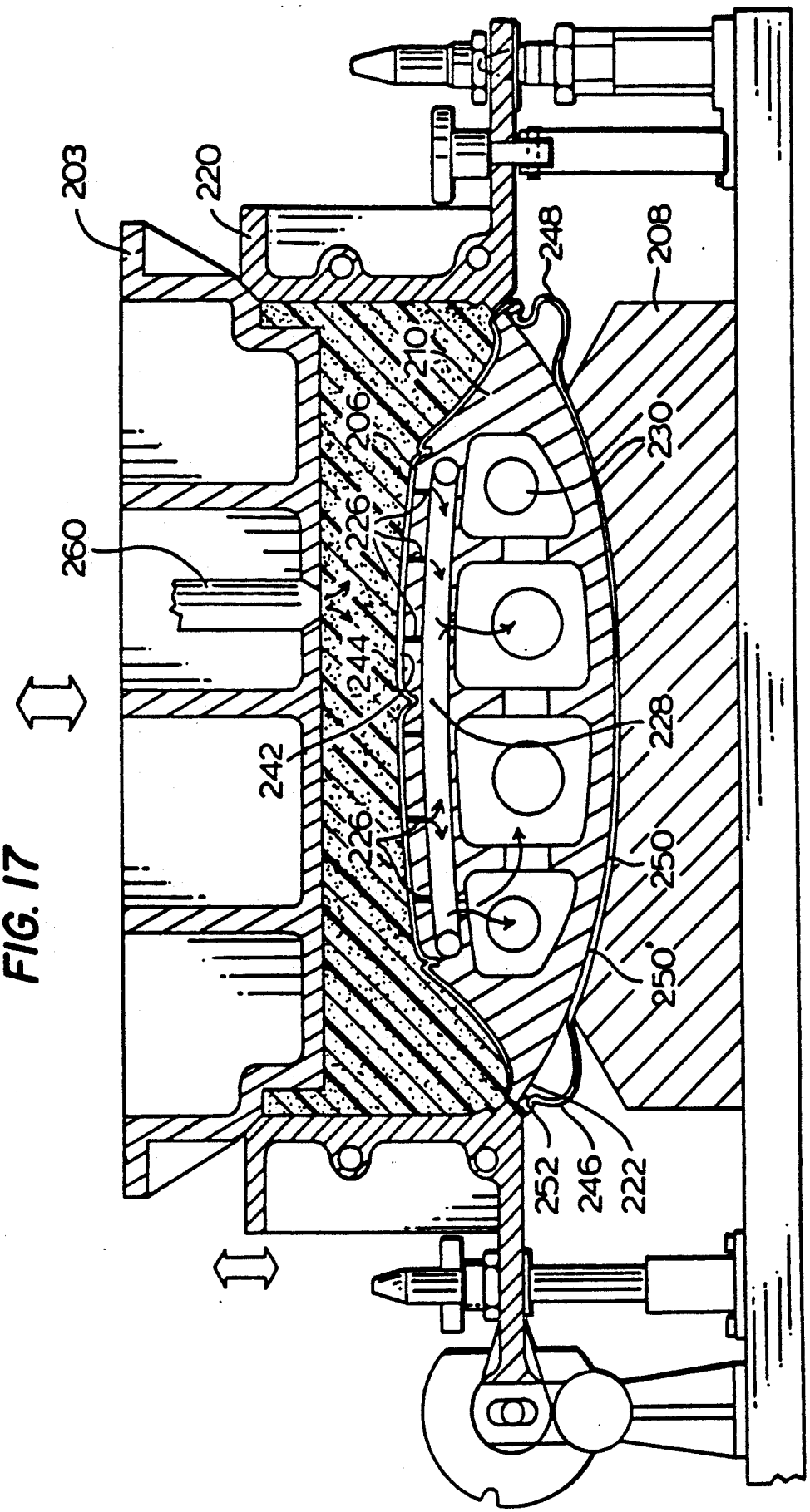
FIG. 17 is a cross-sectional view taken through the apparatus shown in FIG. 16 in use.

With reference to FIGS. 16 and 17, there is shown an improved mould for moulding products using a bag or sack of material, as, for example, a seat back, shown as 200 in FIG. 16. The mould 202 comprising a bottom 204 which carries on the upper surface 206 the design which is to be carried by the outer surface of the bag or sack, the bottom 204 being separable into two components, a base 208 and pivotable tongue 210 pivotable at end 212 relative to bottom 208 in support 214. Tongue 210 is pivotable from a position engaging bottom 208, as shown in FIGS. 16 and 17, to a position where end 216 is elevated from base 208 to permit sack 200 to be inserted thereon. Mould 202 also includes side wall formation 220 movable away from and towards bottom 204. Bottom 204 is undercut at 222 for the purpose of better cooperation and engaging with the lower end of side wall formation 220. Tongue 210 also carries internally pipes and conduits under surface 206 for being secured to a gas pump for the feeding of gases through apertures 226 through surface 206 and for being connected to a vacuum pump for withdrawing air from the interior of the moulding cavity through apertures 226 through the conduits shown in FIG. 17. In this regard, apertures 226 are in communication with collection conduits 228 which are in communication with larger conduits.

Figure 18:
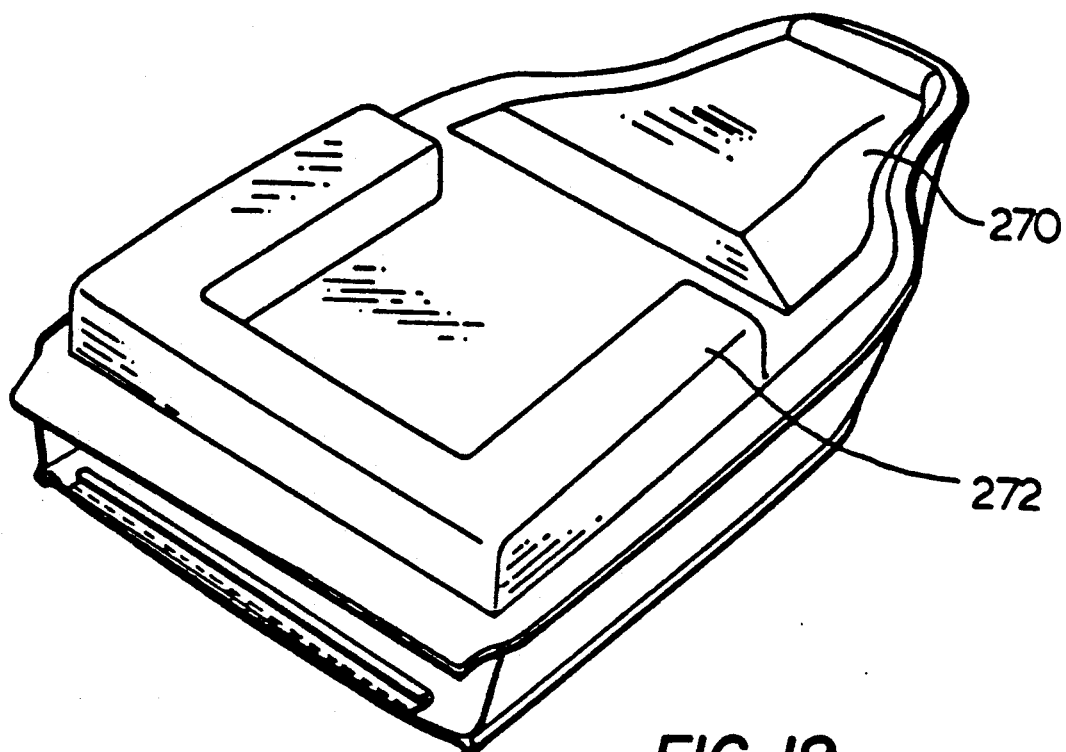
FIG. 18 illustrates the moulded seat back produced from carrying out a process of manufacture using the apparatus shown in FIGS. 16 and 17.

With reference to bag or sack 200, the bag or sack comprises a piece of material 240 making up the "A" surface 242 of the seat back, as shown in FIG. 17, the back of which is the "B" surface 244. Material sheet 240 comprising surfaces 242 and 244 is secured at its side edges to material for enclosing the bag or sack to form the sides 246 and 248 and back 250 of the bag or sack. Stops 252, as shown in FIG. 17, are provided in the form of welting sewn between the peripheral edges of material 240 and the portions making up the side edges and back 246, 248, and 250. In this case, portions 246, 248, and 250 comprise a single sheet of material and thus sections 246, 248, and 250 represent portions of the larger sheet 250'. After manufacture of the bag or sack 200, the bag is turned inside-out,. as shown in FIGS. 16 and 18, tongue 210 is elevated by pivoting relative to support 214 and the bag is slid thereover. Tongue 210 is then returned to the position shown in FIG. 17 with sheet portion 250 of material 250' clamped between the base 208 and tongue 210. Side wall 220 is thereafter brought down to the position shown in FIG. 17 and a process very much like the process shown in FIGS. 10 and 14 inclusive is carried out. Particularly, material 240 is blown up with air introduced from an air pump through apertures 226 to draw stops 252 to the position shown in FIG. 17 being unable to pass between side walls 220 and the peripheral edge of tongue 210 as shown in FIG. 7. Thereafter, the vacuum pump (not shown) is activated to withdraw the air from the space between the tongue 210 and material 240 drawing the material to surface 206 of the tongue in intimate contact therewith to conform to the design carried by the tongue on the surface 206. A mechanical device for positioning the material shown in FIGS. 5 and 6 may also be used employing individually operable segments. The side wall formation is then lowered to clamp sheet 240 in a like manner as sheet 140 was clamped as shown in FIG. 12. Thereafter, top 203 of the mould is applied to the side walls and foamable thermoplastics material is injected through injection nozzle 260 to form the finished product.

With reference to FIG. 17, appropriate alignment and locking devices are shown for aligning and closing the components relative to one another.

Figure 19:
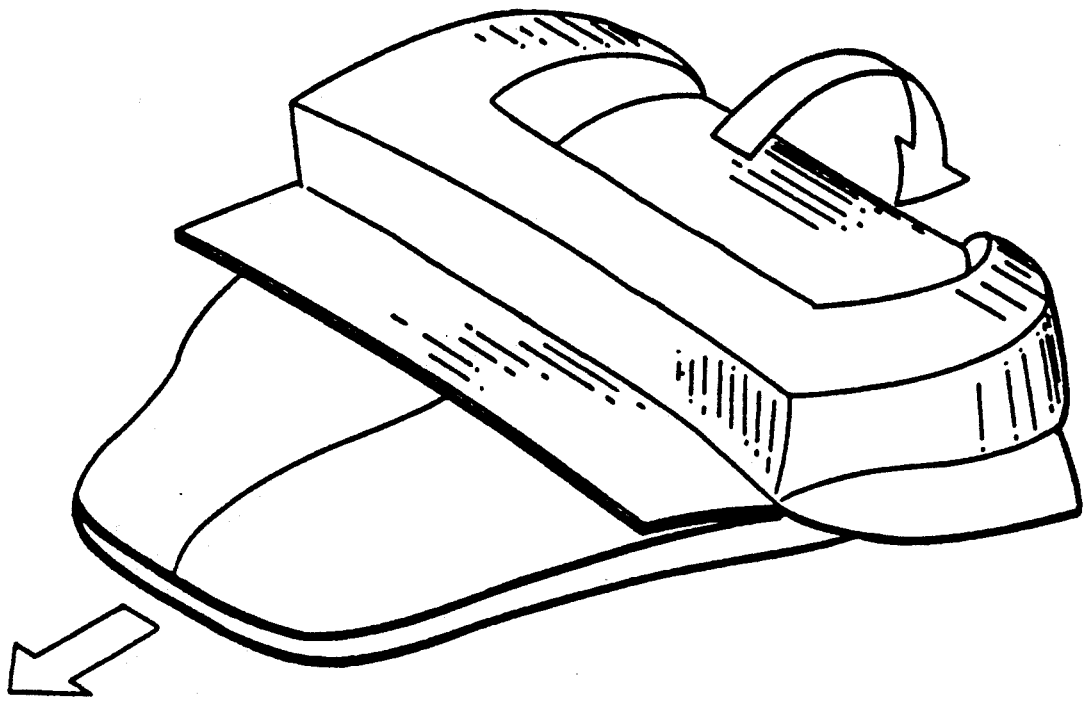
FIG. 19 illustrates the reversing of the product shown in FIG. 18 to bring the exterior surface of the sack to the outside.

After completing the moulding process, the top 203 is elevated, the side walls elevated, the tongue pivoted at end 212 relative to support 214 and the sack now being the foamed thermoplastic material in accordance with the configuration of the moulding cavity is removed from the tongue. The finished product in an inside-out condition may be as shown in FIG. 18. With reference to FIG. 19, the sack is turned right-side-out as shown in FIG. 19 ready for mounting and use.

Many changes can be made to the embodiments of the invention. For example, the stops used may comprise different seams, for example, a deck seam or seams or french seam or seams or any seam of at least about fifty different seams, or welting. It is intended that all material disclosed herein be interpreted as illustrative of the invention and not in a limiting sense.

As many changes can also be made to the embodiments of the invention relating to the improved moulding apparatus and components and processes of manufacture without departing from the scope of the invention, it is intended that all material contained herein be interpreted as illustrative of the invention and not in a limiting sense.

What is claimed is:

1. A process for the manufacture of a seat back product capable of being mounted in use so as to present a back engaging surface of a predetermined shape, said method comprising the steps of:

providing a bag comprising seat back material, side edge material, and back material joined together to define a generally bag-like shape having an open end and a closed end, the material of said bag having exterior and interior surfaces, the exterior surfaces being presented exteriorly when the seat back product is mounted in use, mounting the open end of said bag in an inside-out condition onto a tongue-like mould part having the complement of said predetermined shape on a mould surface thereof so that the exterior surface of said seat back material faces toward said mould surface and the interior surface faces away from said mould surface, shaping the exterior surface of said seat back material of said bag into the predetermined shape by conforming it to the mould surface of said tongue-like mould part, moulding and curing a foamable material between the interior surface of the seat back material and spaced cooperating mould surfaces while the exterior surface is conformed to said mould surface so as to form a foam pad bonded to the interior surface of said seat back material capable of retaining the predetermined shape of the exterior surface thereof, removing said seat back material and said foam pad bonded thereto from said mould surfaces and said bag and bonded pad from said tongue-like mould part, and inverting said bag and bonded pad so that the exterior surfaces of the material of the bag are exposed exteriorly and said foam pad is enclosed within the bag.

2. A process as defined in claim 1 wherein the conforming o the exterior surface of the seat back material to said mould surface includes the step of applying a vacuum through openings in the tongue-like mould part extending to said mould surface to draw the exterior surface of the seat back material into conformity with the mould surface.

3. A process as defined in claim 2 wherein the conforming of the exterior surface of said seat back material to said mould surface includes the step of moving a cooperating peripheral mould part into cooperating relation with an inner marginal peripheral edge of the interior surface of the seat back material so as to position a peripheral seam between the seat back material and said side edge material exteriorly of and between said cooperating peripheral mould part and a marginal edge surface of said mould surface of said tongue-like mould part so that the peripheral seam acts as a stop against the cooperating mould part to the ingress of the seat back material during the conforming procedure.

4. A process as defined in claim 3 wherein the conforming of the exterior surface of the seat back material to said mould surface includes the step of moving plunger means toward the interior surface of the seat back material so as to move the exterior surface thereof toward the mould surface prior to the application of the vacuum.

* * * * *